(12) United States Patent
Kang et al.

(10) Patent No.: US 7,778,177 B2
(45) Date of Patent: Aug. 17, 2010

(54) APPARATUS AND METHOD OF VARIABLE BANDWIDTH MULTI-CODEC QOS CONTROL

(75) Inventors: Tae Gyu Kang, Daejeon (KR); Do Young Kim, Daejeon (KR); Hae Won Jung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 606 days.

(21) Appl. No.: 11/634,561

(22) Filed: Dec. 6, 2006

(65) Prior Publication Data

US 2007/0133441 A1  Jun. 14, 2007

(30) Foreign Application Priority Data

Dec. 8, 2005  (KR) .................. 10-2005-0120093

(51) Int. Cl.
 *H04J 1/16* (2006.01)
(52) U.S. Cl. ...................... 370/232; 709/219
(58) Field of Classification Search .......... 370/229, 370/230, 231, 232, 233, 234, 235, 468; 709/217–219
 See application file for complete search history.

(56) References Cited

U.S. PATENT DOCUMENTS

| 5,657,420 | A | 8/1997 | Jacobs et al. |
| 6,014,694 | A | 1/2000 | Aharoni et al. |
| 2003/0119515 | A1 | 6/2003 | Holler et al. |
| 2003/0189900 | A1 | 10/2003 | Barany et al. |
| 2004/0002856 | A1 | 1/2004 | Bhaskar et al. |
| 2004/0066763 | A1 | 4/2004 | Hashimoto et al. |
| 2004/0160979 | A1 | 8/2004 | Pepin et al. |
| 2004/0185786 | A1 | 9/2004 | Mirbaha et al. |
| 2004/0213257 | A1 | 10/2004 | Abdelilah et al. |
| 2005/0055203 | A1 | 3/2005 | Makinen et al. |
| 2005/0201414 | A1* | 9/2005 | Awais ................. 370/468 |

FOREIGN PATENT DOCUMENTS

| KR | 10-2000-0041859 | 7/2000 |
| KR | 10-2000-0072520 | 12/2000 |
| KR | 10-2004-0011257 | 2/2004 |
| KR | 10-2004-0049559 | 6/2004 |

OTHER PUBLICATIONS

Rosenberg, et al., "SIP: Session Initiation Protocol." Jun. 2002, *The Internet Society*.

* cited by examiner

*Primary Examiner*—Jason E Mattis
*Assistant Examiner*—Dady Chery
(74) *Attorney, Agent, or Firm*—Ladas & Parry LLP

(57) ABSTRACT

An apparatus and method of variable bandwidth multi-codec quality of service (QoS) control are provided. The apparatus for controlling the QoS of a variable bandwidth multi-codec includes: a network state detection unit detecting a network state including at least one of a packet loss ratio, a packet loss interval, and a packet delay time based on an RTP packet transmitted to and received from a destination for which a call connection is established; and a codec control unit updating a transmission rate by comparing the detected resultant value with an already set reference value and increasing or decreasing the transmission rate, and controlling the variable bandwidth multi-codec to code data with the updated transmission rate. According to the apparatus and method, data can be coded with a codec transmission rate suitable for a network state identified during a voice call after the call is set up.

10 Claims, 7 Drawing Sheets

APPARATUS AND METHOD OF VARIABLE BANDWIDTH MULTI-CODEC QOS CONTROL

CROSS-REFERENCE TO RELATED PATENT APPLICATIONS

This application claims the benefit of Korean Patent Application No. 10-2005-0120093, filed on Dec. 8, 2005, in the Korean Intellectual Property Office, the disclosure of which is incorporated herein in its entirety by reference.

BACKGROUND OF THE INVENTION

1. Field of the Invention

The present invention relates to a variable bandwidth multi-codec quality of service (QoS) control technology, and more particularly, to an apparatus and method by which when a real-time multimedia service is provided through an interoperation between a packet network and conventional wire and wireless networks and a caller and a callee use variable bandwidth multi-codecs providing different transmission rates, the transmission rates of the variable bandwidth multi-codecs are determined with respect to the transferring capability of the networks so that when data is transferred through the networks the transfer delay of the networks and packet loss are minimized to transfer high quality codec data.

2. Description of the Related Art

A variable bandwidth multi-codec is a technology for converting natural sound into digitized codec data having a plurality of transmission rates. An example is a codec technology dividing a frequency band into a narrowband (from 300 Hz to 3,400 Hz), a broadband (from 50 H to 7,000 Hz), and an audio band (from 20 to 20,000 Hz), and calculating transmission rates of 8, 12, 14, 16, 18, 20, 22, 24, 26, 28, 30, and 32 bps in each bandwidth.

For example, when in a voice over Internet protocol (VoIP) voice call service, a bandwidth provided by the network is variable and unpredictable, a transmission rate of 32 bps of a variable bandwidth multi-codec is a codec transmission rate calculating best sound quality and a transmission rate of 8 kpbs is a codec transmission rate providing the lowest sound quality, if there is a room in the network bandwidth and a high bandwidth can be transmitted, the transmission bandwidth of 32 kbps is transmitted, and if the network bandwidth changes and the network situation becomes worse, the transmission rate is lowered to 30, 28, . . . , so that network transfer can be smoothly performed though the quality of sound is degraded. In the variable bandwidth multi-codec, if the transmission rate is high, the quality of sound is good but the probability of transmission loss and delay in a network is high and if the transmission rate is low, the quality of sound is not good but the probability of transmission loss and delay in a network is low.

This variable bandwidth multi-codec QoS control technology is needed in communications between networks to which two different standards are applied, and is mainly used in a gateway and a terminal that manage and control Internet phones (VoIP) in a packet network (the Internet). The gateway is broken down into an access gateway, a trunk gateway and a media gateway.

The access gateway is a device required to connect an ordinary telephone user of a wire or wireless network, such as a public switched telephone network (PSTN), to a packet network (VoIP or voice over asynchronous transfer mode (VoATM)), and converts voice data from an ordinary telephone so that the data can be transferred to a packet network.

The trunk gateway is a device to connect a PSTN and a packet network, and allows a large volume of data occurring in the PSTN to be transmitted through the packet network.

The media gateway is a data conversion device to transfer data between heterogeneous networks complying with standards different from each other, and includes the access gateway and the trunk gateway.

A draft standard in relation to the transcodec applied to these gateways is described in 'Transcoding Services Invocation in the Session Initiation Protocol' of Internet Engineering Task Force (IETF).

Meanwhile, in order to apply a variable bandwidth multi-codec, a signal protocol conversion technology to set up a call is applied. This signal protocol conversion technology is described in RFC 3261 SIP, RFC 3264 Offer/Answer SDP, RFC 2833 RTP Payload for DTMP Digits, Telephony Tones and Telephony Signals, RFC 2327 SDP, RFC 3108 ATM SDP, RFC 1890 RTP Profile Payload type of the IETF.

However, even though a variety of real-time multimedia services are provided by applying this signal protocol conversion technology, a control function for a variable bandwidth multi-codec cannot be provided and the services are limited to setting up a voice call and transferring voice between basic transmission and reception of a call.

The conventional technologies for determining the transmission rate or method of a codec are as follows.

In Korean Patent Publication of Application No. 10-2004-0011257 (2004.2.5), a transmission rate of an MPEG codec is selected according to the size of a buffer. Also, in Korean Patent Publication of Application No. 2000-0072520 (2000.12.5), a method of transmitting voice data with priority is disclosed. In Korean Patent Publication of Application No. 10-2004-0049559 (2004.6.12), a method of securing resources for Internet packet data based on an access setting protocol is suggested.

In U.S. Pat. No. 6,014,694 (Jan. 11, 2000), a control method between a video server and a receiver is disclosed. Also, in U.S. Patent No. US2003/0119515 A1 (Jun. 26, 2003), an automatic construction method for a codec in a mobile communication CDMA base station is suggested. In U.S. Patent No. US2004/0066763 A1 (Apr. 4, 2004), a method of using a QoS packet to improve a transmission capability in a wireless LAN is suggested. In U.S. Patent No. US2003/0189900 A1 (Oct. 9, 2003), a method of applying an AMR codec of a mobile communication using a frequency line transmission rate of air interface and an error rate is suggested. In U.S. Patent No. US2005/0201414 A1 (Sep. 15, 2005), a method of optimizing an IP overhead on Ethernet by loading and transmitting multiple codec frames per packet in an Internet telephone is suggested. In U.S. Patent Nos. US2004/0002856 A1 (Jan. 1, 2004) and US2005/0055203 A1 (Mar. 10, 2005), a multi-rate frequency domain speech codec system is suggested. In U.S. Patent No. US2004/0185786 A1 (Sep. 23, 2004), a method using a predictor output frame structure in an evolved mobile communication device is suggested. In U.S. Patent No. US2004/0213257 A1 (Oct. 28, 2004), a method of negotiating for establishing a channel suitable for predetermined codec transmission is suggested. In U.S. Patent No. US2004/0160979 A1 (Aug. 19, 2004), a method of controlling an AMR codec using source coding and channel coding is suggested. In U.S. Pat. No. 5,657,420 (Aug. 12, 1997), a codec method in relation to a variable rate vocoder of the U.S. Qualcomm is suggested.

These conventional technologies cannot control the QoS quality control in relation to a variable bandwidth multi-codec because of lack of technologies to control a voice data transmission packet loss ratio, delay, and measuring interval adjustment. Accordingly, a method of providing a high quality service by changing a variety of transmission rates of a variable bandwidth multi-codec with respect to change in the state of a network bandwidth and applying the characteristic of controlling the QoS is needed.

SUMMARY OF THE INVENTION

The present invention provides an apparatus and method of providing a high quality service in a real-time multimedia service by predicting a bandwidth of a network that cannot be predicted and selecting an optimal variable bandwidth multi-codec transmission rate.

According to an aspect of the present invention, there is provided an apparatus for controlling the quality of service (QoS) of a variable bandwidth multi-codec including: a network state detection unit detecting a network state including at least one of a packet loss ratio, a packet loss interval, and a packet delay time based on an real-time transport protocol (RTP) packet transmitted to and received from a destination for which a call connection is established; and a codec control unit updating a transmission rate by comparing the detected resultant value with an already set reference value and increasing or decreasing the transmission rate, and controlling the variable bandwidth multi-codec to code data with the updated transmission rate.

According to another aspect of the present invention, there is provided a method of controlling the quality of service (QoS) of a variable bandwidth multi-codec including: detecting a network state including at least one of a packet loss ratio, a packet loss interval, and a packet delay time based on an real-time transport protocol (RTP) packet transmitted to and received from a destination for which a call connection is established; and updating a transmission rate by comparing the detected resultant value with an already set reference value and increasing or decreasing the transmission rate, and controlling the variable bandwidth multi-codec to code data with the updated transmission rate.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention relates to an apparatus and method of controlling quality of service (QoS) to maintain the quality of voice at its best in a real-time multimedia service, by providing a variable bandwidth multi-codec in which a network transmission bit rate is variable, to a network. According to the method, during a voice call after the call is set up, the state of a network is detected and according to the detected result, the transmission rate of the codec is selected or changed such that a codec transmission rate suitable for the network state is transmitted. The method can be used Internet telephony (voice over Internet protocol (VoIP)).

The present invention includes a means for adjusting a packet loss ratio, a packet loss interval, and a packet delay interval in order to compare and measure a packet loss ratio, a packet delay time, and a packet loss interval by comparing a prediction bandwidth required for a network and a variable bandwidth of a codec, and actively handle rapid changes in the network state. Also, the method of the present invention includes an operation of adjusting a time period together with a packet loss ratio reference value, a packet loss interval reference value, and a packet delay reference value to analyze the state of a network in order to minimize an overhead of identifying a network situation by frequently applying a network situation during media communication when a real-time bi-directional multimedia service is provided.

The objectives, characteristics, and merits described above will now be described more clearly with reference to the accompanying drawings, and accordingly, a person skilled in the art of the present invention will be able to use the technical idea of the present invention more easily. Also, in the explanation of the present invention, if it is determined that detailed explanation of a conventional technology related to the present invention may confuse the scope of the present invention, the description will be omitted. Hereinafter, the present invention will be described in detail by explaining preferred embodiments of the invention with reference to the attached drawings.

In the embodiment of the present invention to be described below, an example in which a call processing flow between a calling side and a called side is processed together with an IETF standard will be explained. At this time, a call flow from the calling side to the called side described in the IETF standard will be processed according to the IETF standard, and only invented contents that are not included in the IETF standard will be described below.

The method and apparatus according to the present invention will now be described more fully with reference to the accompanying drawings.

Figure 1:
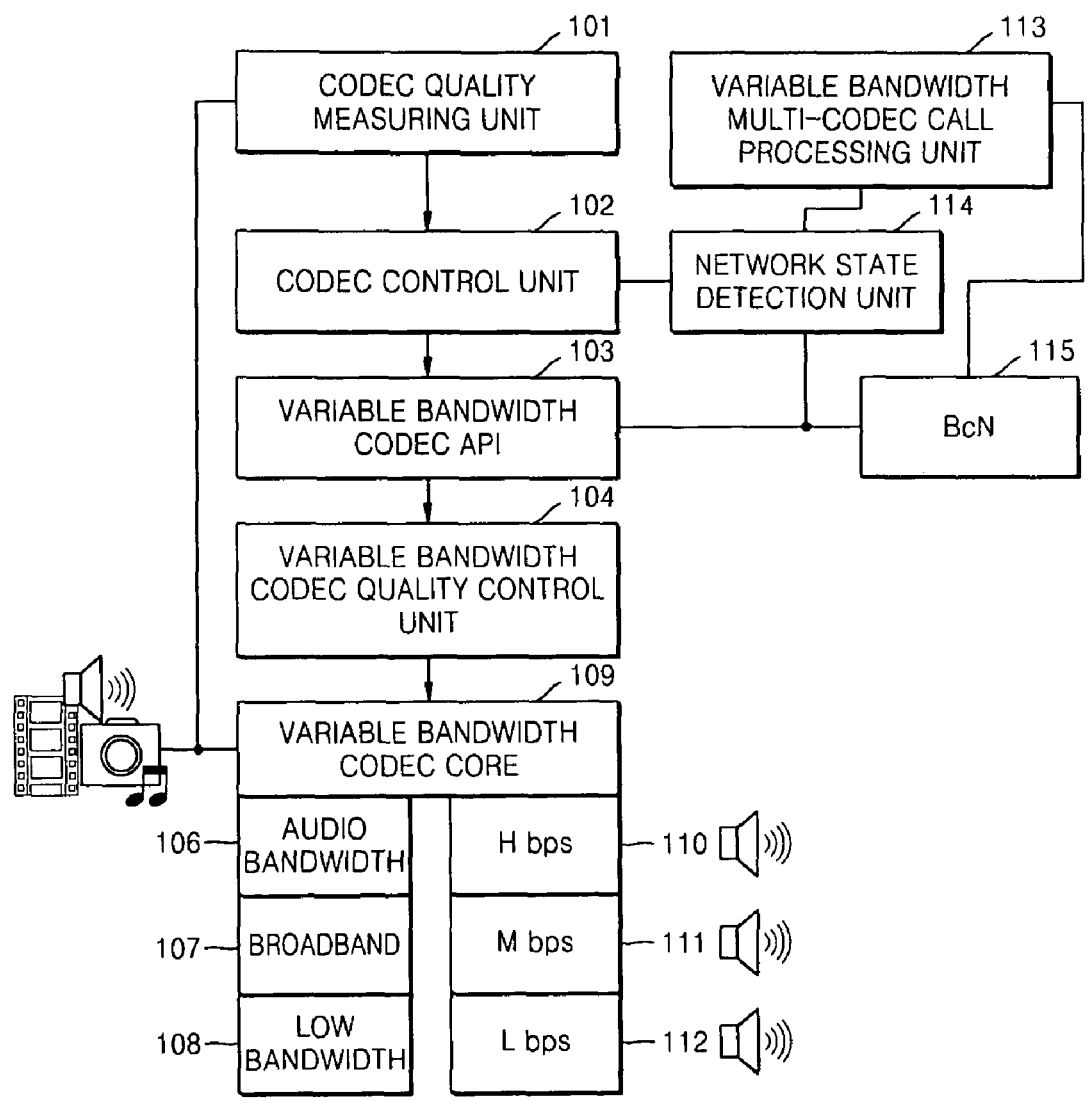
FIG. 1 is a block diagram illustrating a structure of a variable width multi-coded QoS control apparatus according to an embodiment of the present invention.

FIG. 1 is a block diagram illustrating a structure of a variable width multi-coded QoS control apparatus according to an embodiment of the present invention and the apparatus is composed of a codec quality measuring unit 101, a codec control unit 102, a variable bandwidth codec API 103, a variable bandwidth codec quality control unit 104, a variable bandwidth codec core 109, a variable bandwidth multi-codec call processing unit 113, a network state detection unit 114, and a broadband convergence network (BcN) 115.

The codec quality measuring unit 101 measures the quality of a variable bandwidth multi-codec. That is, since the number of the bandwidth of a codec is only one in the conventional technology, measuring of the quality in relation to the codec is not needed during a call conversation. However, in the variable bandwidth multi-codec having multiple bandwidths and multiple transmission rates, the quality is measured in real time during a voice call so that an input value is provided to the variable bandwidth codec control unit 102. An example of measuring the quality is measuring the quality of voice included in a signal received from a destination according to a method such as perceptual evaluation of speech quality (PESQ).

The codec control unit 102 controls the transmission bit rate of the variable bandwidth multi-codec by using the network state detected by the network state detection unit 14. Also, the codec control unit 102 can controls the transmission bit rate by increasing or decreasing the rate based on the quality measured in the codec quality measuring unit 101.

The variable bandwidth codec API 103 plays an interface role transferring the variable bandwidth multi-codec transmission bit rate determined in the codec control unit 102.

The variable bandwidth codec quality control unit 104 enables smooth exchange of information between the variable bandwidth codec API 103 and the variable bandwidth codec core 109.

The variable bandwidth codec core 109 has variable bandwidth including an audio bandwidth 106, a broadband 107, and a low band 108, and is formed with a multi-codec providing multiple transmission rates of H bps 110, M bps 111, and L bps 112.

The variable bandwidth multi-codec call processing unit plays a role of SIP/SDP of the IETF (www.ietf.org).

The network state detection unit 114 detects a network state including at least one of a packet loss ratio, a packet loss interval, and a packet delay time based on a real-time transfer protocol (RTP) packet transmitted to and received from a destination for which a call connection is established. Also, by transmitting and receiving data to test a network state, a network state is detected. Information on the network state thus detected is provided to the codec control unit 102.

The BcN 115 is a network through which variable bandwidth multi-codec data is transmitted, and collectively indicates a wire communication PSTN, a 3GPP, mobile communication of 3GPP2, a wireless LAN, a broadcasting network and a cable network.

Meanwhile, the network state detection unit 114 detects a network state at predetermined monitoring intervals, and the codec control unit 102 may also control a variable bandwidth multi-codec by updating the transmission rate at the predetermined monitoring intervals. Here, the predetermined monitoring intervals are increased or decreased based on the result of comparing the value of a currently detected network state with the value of a previously detected network state.

Figure 2:
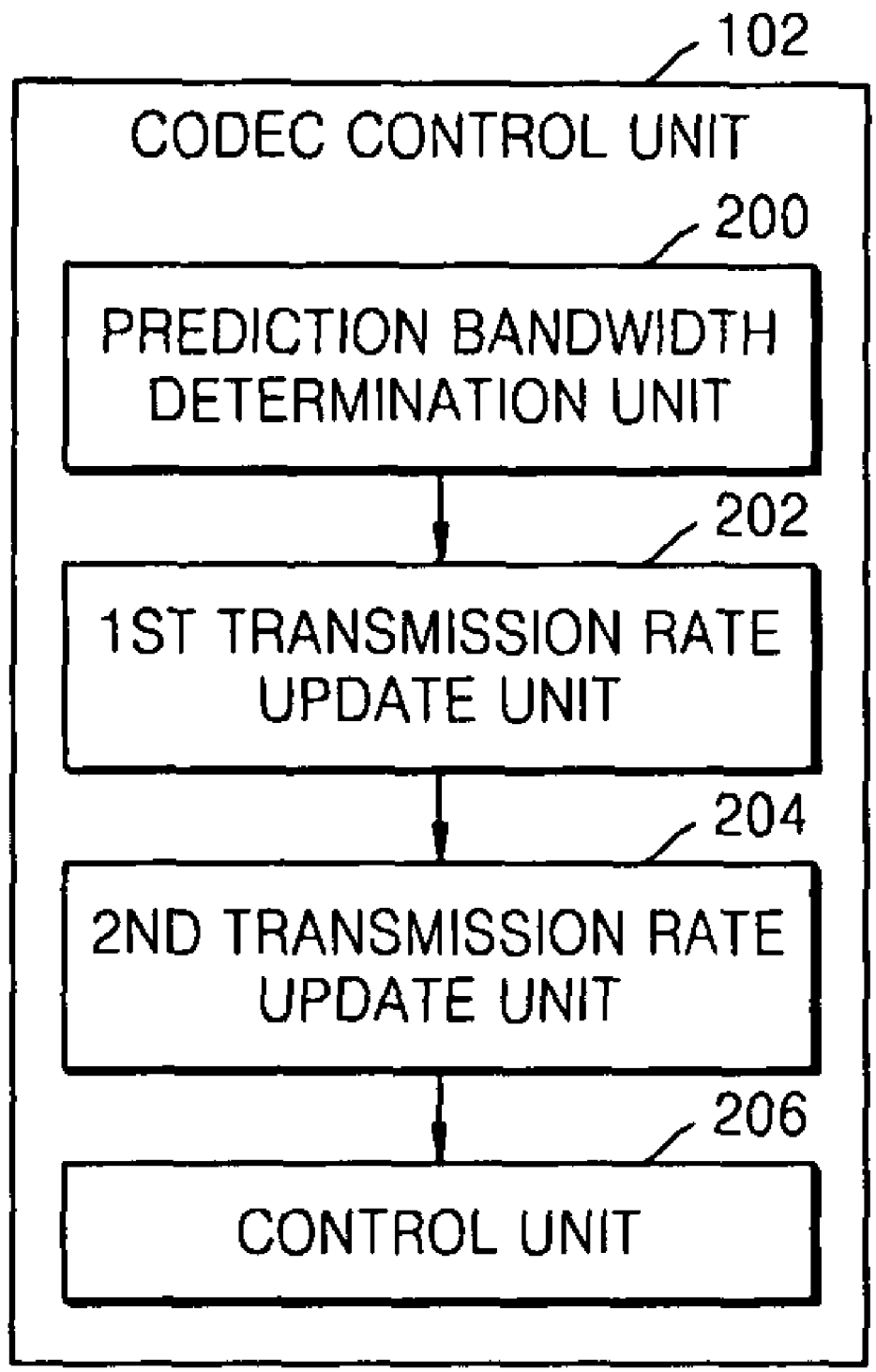
FIG. 2 is a block diagram illustrating a structure of a codec control unit of FIG. 1 according to an embodiment of the present invention.

FIG. 2 is a block diagram illustrating a structure of the codec control unit 102 of FIG. 1 according to an embodiment of the present invention, and the codec control unit 102 is composed of a prediction bandwidth determination unit 200, a first transmission rate update unit 202, a second transmission rate update unit 204 and a control unit 206.

The prediction bandwidth determination unit 200 analyzes data for testing the interoperation characteristic of a network and the network state transmitted and received, and determines a prediction bandwidth.

If the determined prediction bandwidth is less than the previous transmission rate, the first transmission rate update unit 202 decreases the previous transmission rate and updates the transmission rate.

The second transmission rate update unit 204 compares the detected packet loss ratio, packet loss interval and packet delay time with already set reference values, and by decreasing or increasing the transmission rate passing through the first transmission rate update unit 202, updates the transmission rate.

Figure 3:
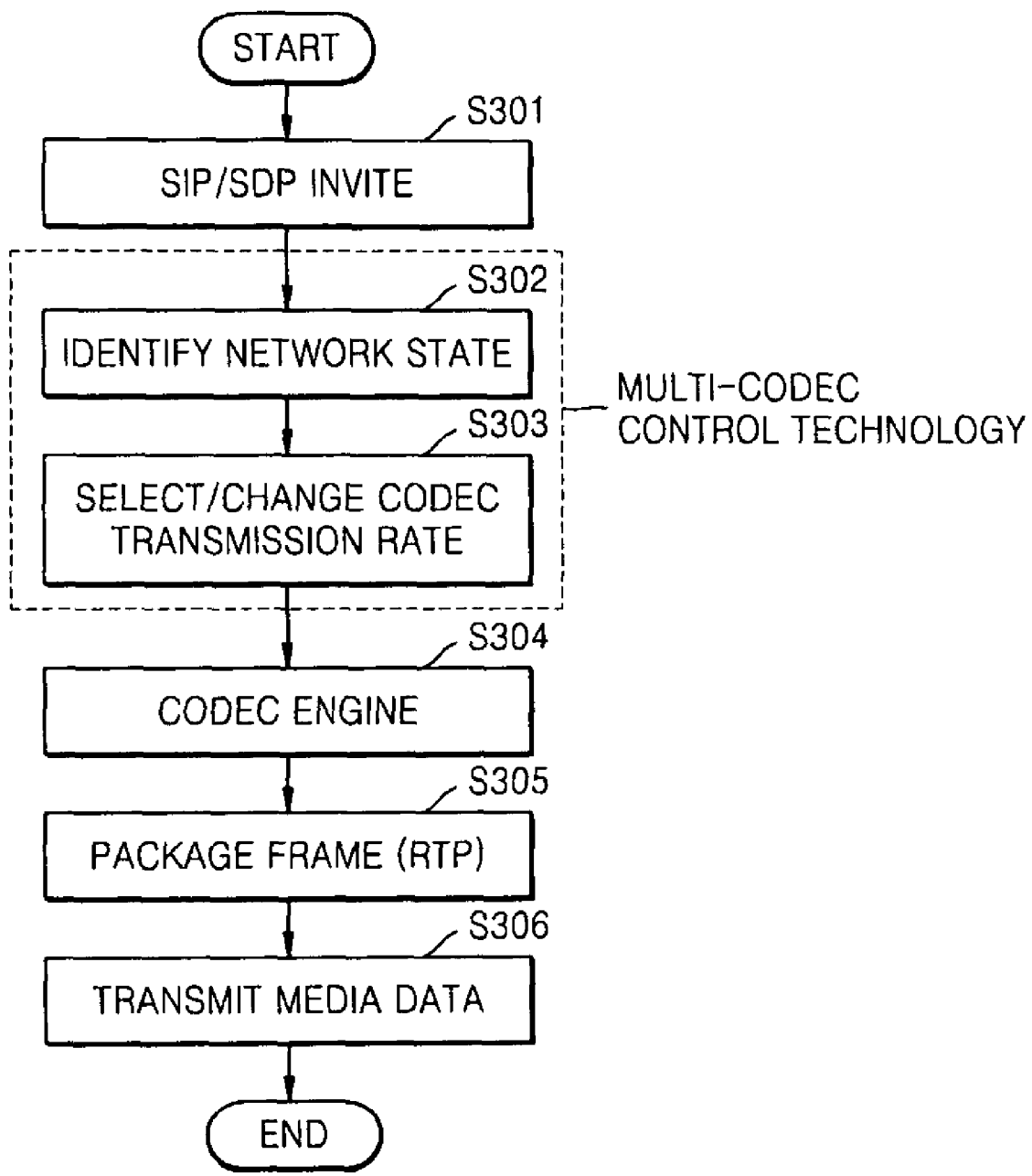
FIG. 3 is a schematic flowchart illustrating a method of controlling a variable width multi-codec according to an embodiment of the present invention.

FIG. 3 is a schematic flowchart illustrating a method of controlling a variable width multi-codec according to an embodiment of the present invention.

A call connection is established by a variable bandwidth multi-codec call processing unit 113 using SIP/SDP INVITE in operation S301. Then, a current state of a network is detected by a network state detection unit 114 in operation S302. By using the detected network state information, the codec transmission rate is selected and/or changed by a codec control unit 102 in operation S303. The selected codec transmission rate is transferred to a variable bandwidth codec API 103, a variable bandwidth codec quality control unit 104, and a variable bandwidth codec core 109, and as a result, codec data is generated in a code engine built in the variable bandwidth codec core 109 in operation S304. Then, the generated codec data is loaded on a frame package (RTP) in operation S305 and media data is transmitted to a network in operation S306.

In the conventional technology, after SIP/SDP INVITE in operation S301, generation of codec data, frame packaging, and transmission of data are performed in operations S304 and S305 without identifying a network state in operation S302 and selecting and/or changing a codec transmission rate in operation S303. However, in the present invention, detection of a network state in operation S302 and selecting and/or changing a codec transmission rate in operation S303 are added between SIP/SDP INVITE in operation S301 and the codec engine in operation S304 so that an optimum codec transmission rate can be corrected and/or changed with respect to the network state. By doing so, it can be expected that loss of packet data can be prevented and quality of services can be improved.

Figure 4:
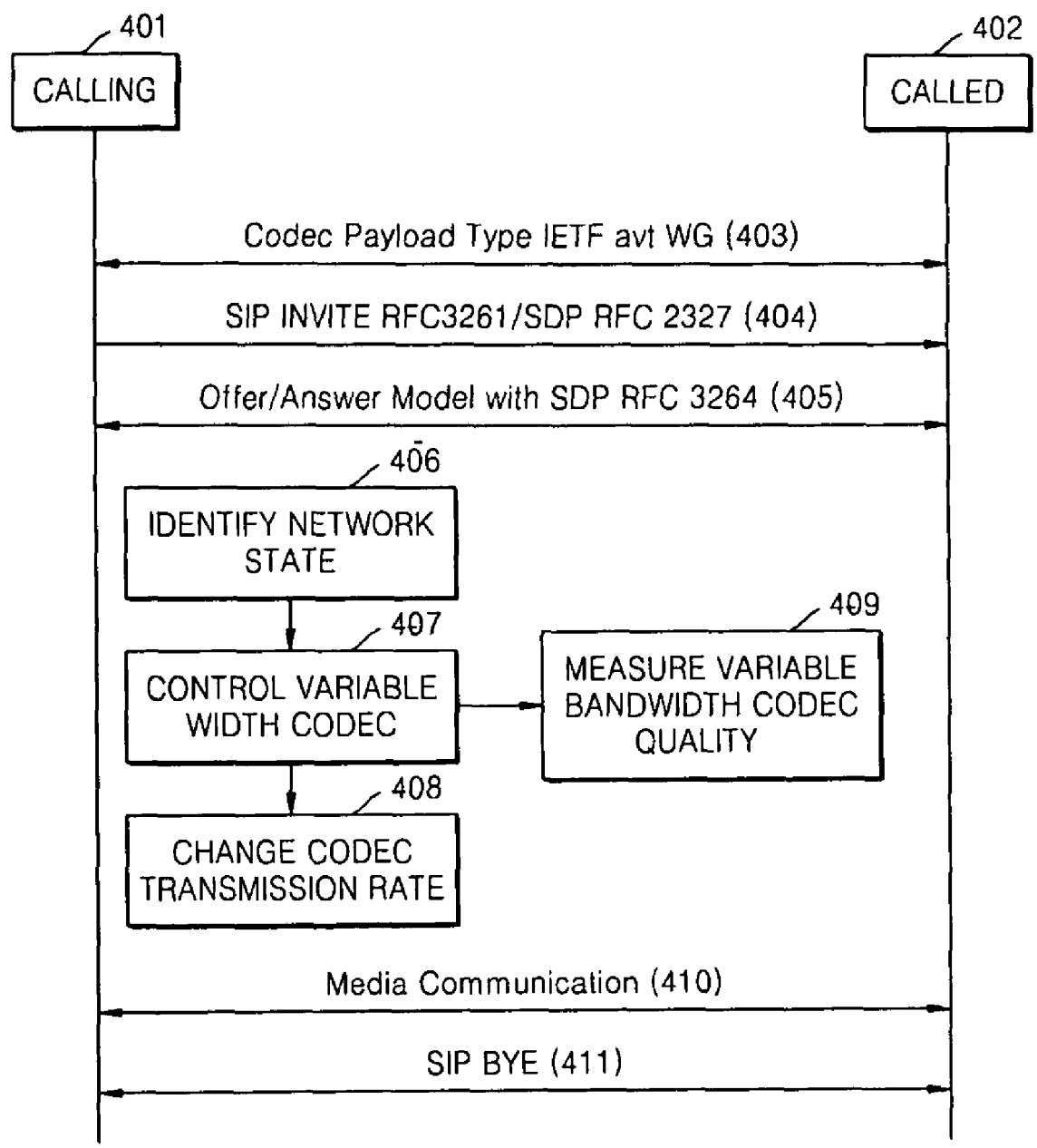
FIG. 4 illustrates processing of a call and transmission of a signal according to an embodiment of the present invention.

FIG. 4 illustrates processing of a call and transmission of a signal according to an embodiment of the present invention.

Referring to FIG. 4, an example of a call processing flow between a calling side 401 and a called side 402 is shown. In order to make codecs identical between the calling side 401 and the called side 402, a codec payload type 403 defined in IEFT at WG is used. By starting calling, establishment of a call connection to the called side 402 begins by an INVITE message defined in IETF RFC 3261 and SDP defined in RFC2327. As a method to make the codec payload type 403 identical both in the calling side 401 and the called side 402, offer/answer model with SDP 405 in RFC 3264 is used. If processing of the offer/answer model with SDP 405 is finished, a voice call connection is completed and a voice conversation begins. On the instant the voice conversation begins, an operation 406 for identification of a network state, an operation 407 for control of a variable bandwidth codec, an operation 408 for changing of a variable bandwidth transmission rate, and an operation 409 for measuring of quality of a variable bandwidth codec are performed. Even while media communication 410 is performed continuously, operations 406 through 409 are continuously performed. If the conversation is finished, an operation 411 for SIP BYE is performed.

Figure 5:
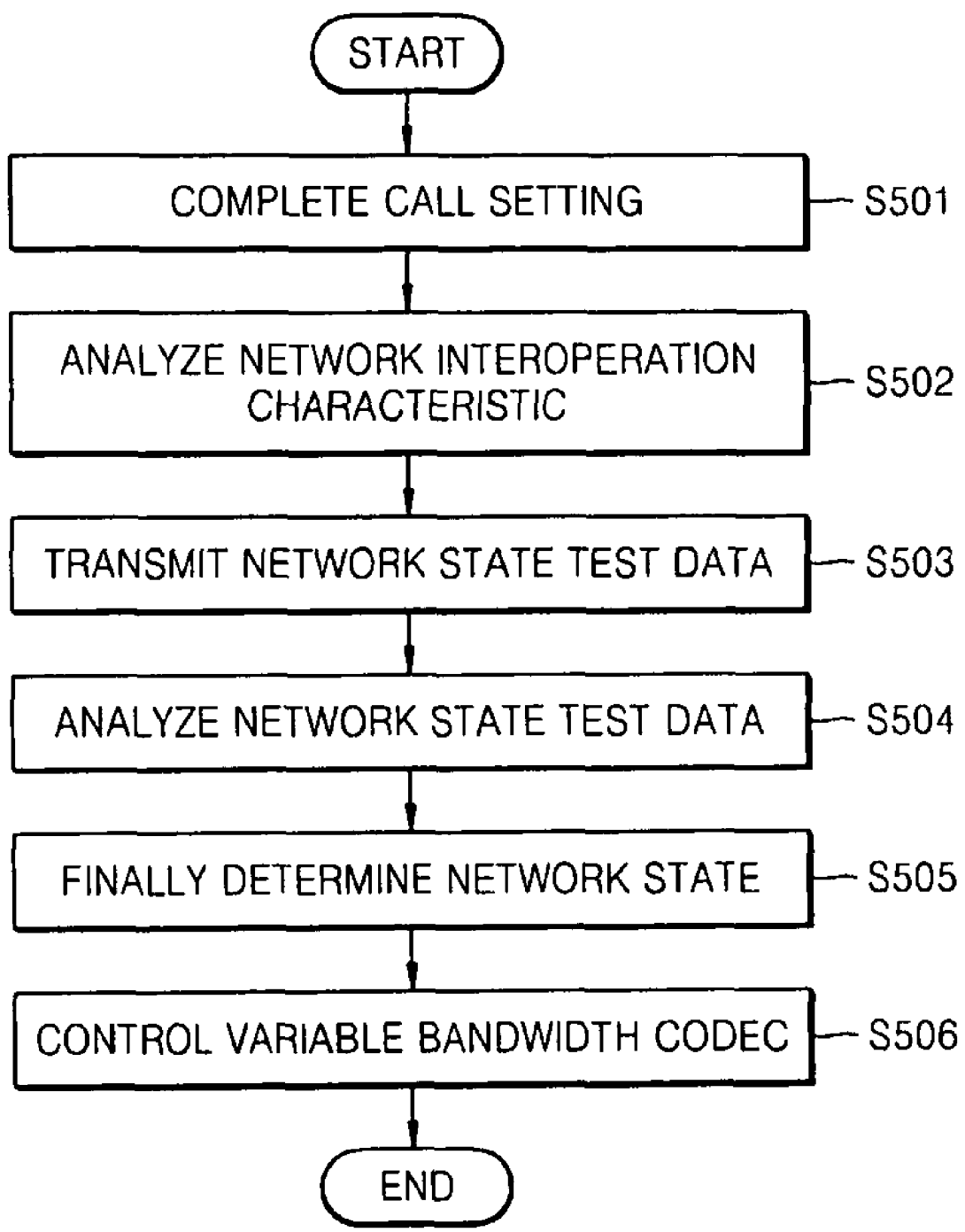
FIG. 5 is a flowchart illustrating analyzing and processing of a network state according to an embodiment of the present invention.

FIG. 5 is a flowchart illustrating analyzing and processing of a network state according to an embodiment of the present invention.

As illustrated in FIG. 5, the flowchart of FIG. 5 shows the operation S302 of FIG. 3 to identify the network state and the operation S406 of FIG. 4 to identify the network state in more detail. First, if a call connection is established in operation S501, the interoperation characteristic of the network is analyzed in operation S502. Since the capability of transmission through a network varies with respect to network interoperation, the interoperation characteristic relates to an operation of a variable bandwidth multi-codec having a plurality of transmission rates. The network interoperation includes an Internet interoperation by a 56 kbps modem, a network interoperation such as ADSL and VDSL, a dedicated line network interoperation, a mobile communication PPP modem interoperation, a Wibro interoperation, and an HSDPA network interoperation. In these networks, network transmission rates are different from each other. According to the network interoperation characteristic, the codec transmission rate is determined. If a network interoperation bandwidth is narrow, a minimum transmission rate codec is selected for the variable bandwidth multi-codec, and if a network interoperation bandwidth is wide, a maximum transmission rate is selected for the variable bandwidth multi-codec. Network state test data is transmitted in operation S503 and the network state test data is analyzed in operation S504. According to the analyzed result, the network state is finally determined in operation S505 and according to the determined result, control of the variable bandwidth codec is performed in operation S506. The finally determined result in operation S505 is used to determine a prediction bandwidth.

Figure 6A:
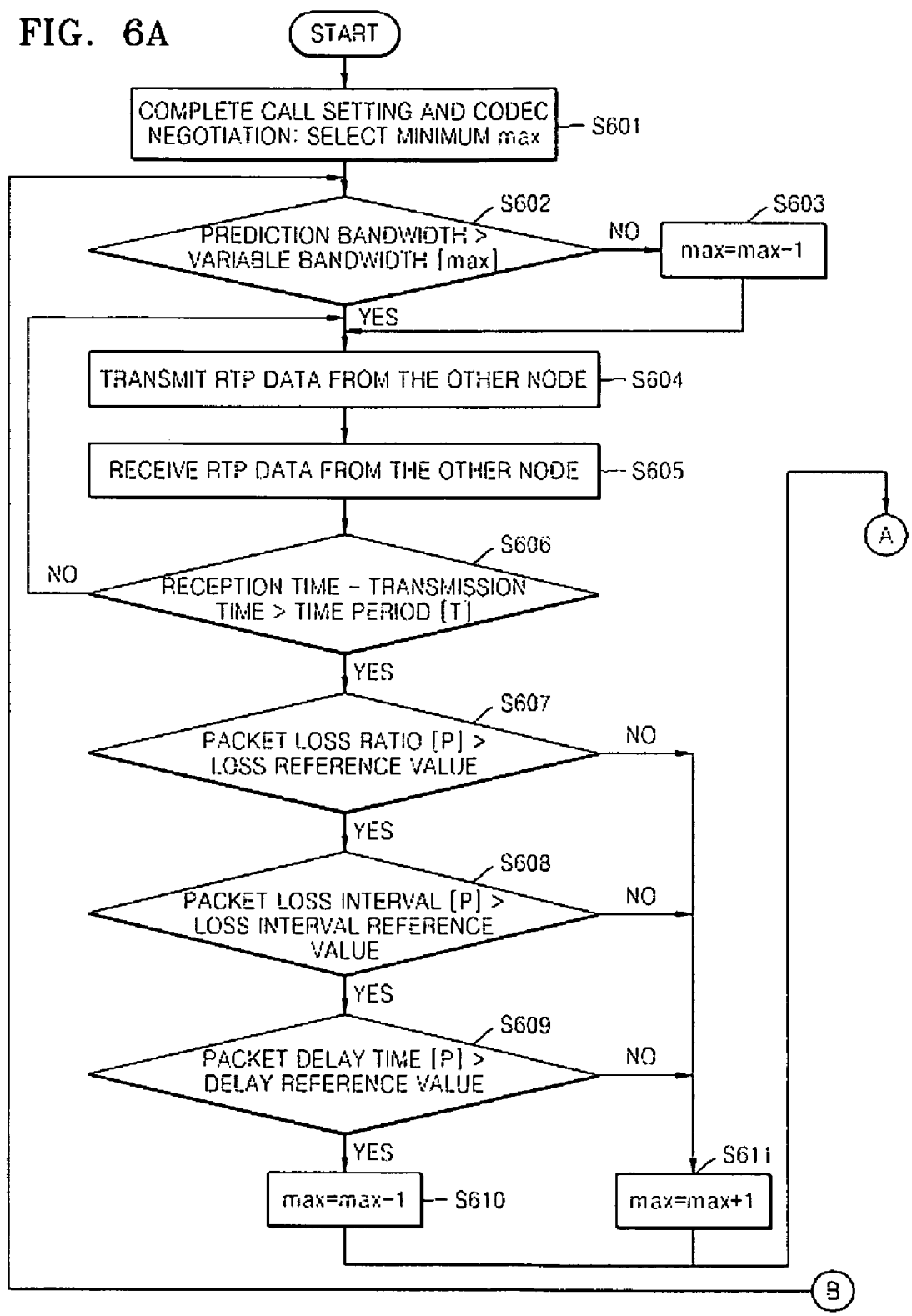
FIG. 6 is a flowchart illustrating an operation of an apparatus and method of measuring and controlling variable bandwidth codec QoS according to an embodiment of the present invention.
Figure 6B:
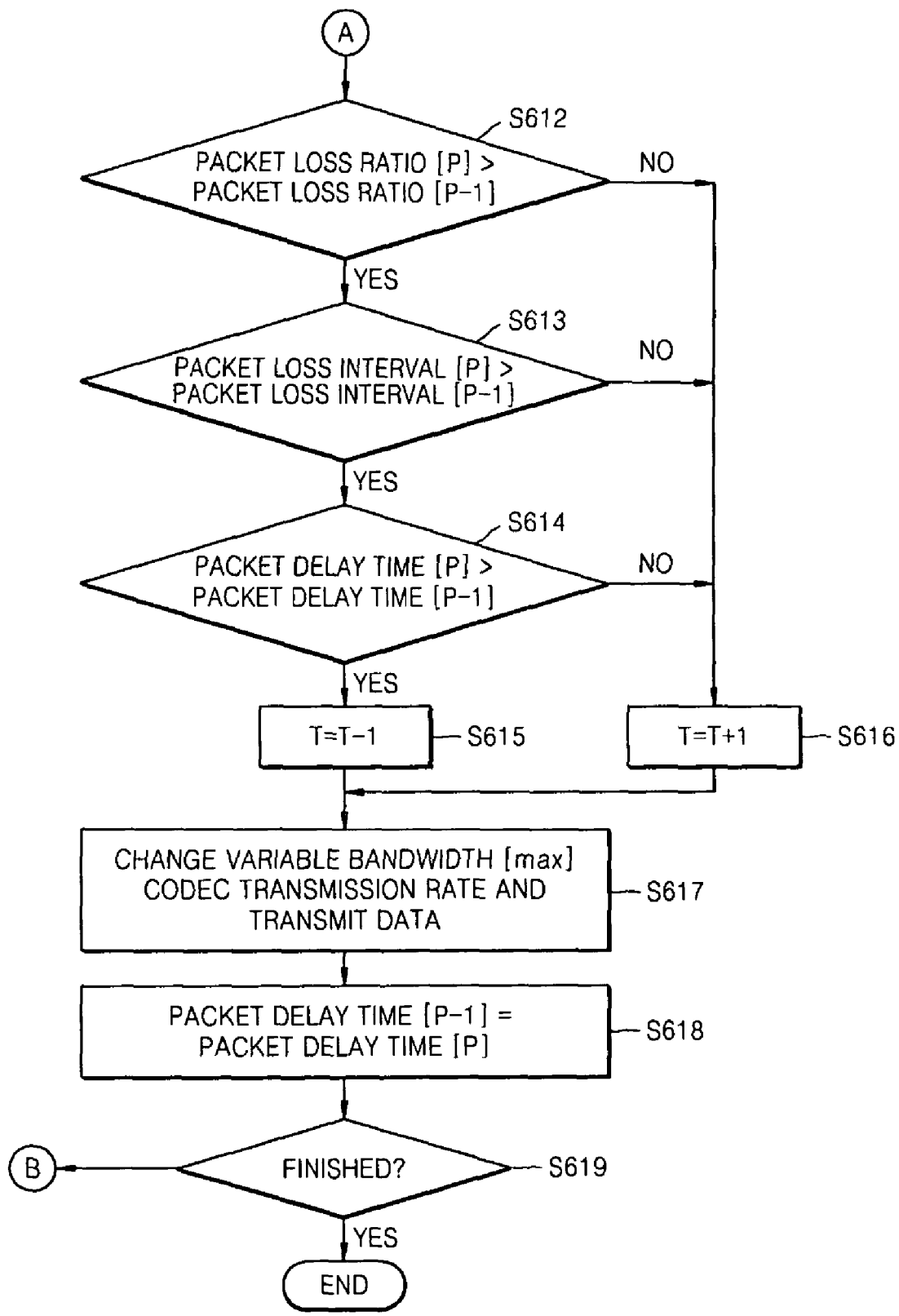

FIG. 6 is a flowchart illustrating an operation of an apparatus and method of measuring and controlling variable bandwidth codec QoS according to an embodiment of the present invention.

As illustrated in FIG. 6, in a state where a call connection is established and codec negotiation is completed by a variable bandwidth multi-codec call processing unit 113, a minimum value is set in a variable bandwidth (max) in operation S601. A prediction bandwidth and the variable bandwidth (max) are compared in operation S602, and if the variable bandwidth (max) is greater than the prediction bandwidth, an operation that max=max−1 is performed in operation S603. Here, an operation for decreasing by 1 can always be performed, but an appropriate number may be subtracted as circumstance requires. Conversely, if the variable bandwidth (max) is less than the prediction bandwidth, an RTP packet is transmitted to the other node in operation S604. On the instant the RTP packet is transmitted, RTP packet from the other node is received in operation S605.

After operation S605, the difference between a reception time and a transmission time is compared with a time period (T) in operation S606. If the time period (T) is not less than the difference between the reception time and the transmission time, operation S604 is performed again. Here, T means the monitoring interval described above. In particular, if the time period (T) is less than the difference between the reception time and the transmission time, it means that the reception and transmission are within the predetermined period. This comparison is to determine whether or not to perform changing of a bandwidth. Without this function, the quality of the variable bandwidth multi-codec would be degraded by too frequent selection or change of the variable bandwidth multi-codec. Accordingly, to solve this problem, the comparison function is performed.

If the difference between the reception time and the transmission time is greater than the time period (T) in operation S606, a packet loss ratio [P] is compared with a loss reference value in operation S607. If the packet loss ratio [P] is greater than the loss reference value in operation S607, a packet loss interval [P] is compared with a loss interval reference value in operation S608. If the result of the comparison indicates that the packet loss interval [P] is greater than the loss interval reference value in operation S608, a packet delay time [P] is compared with a delay reference value in operation S609. If the result of the comparison indicates that the packet delay time [P] is greater than the delay reference value in operation S608, an operation max=max−1 is performed in operation S610, and if the reference value is less in operations S607 through 609, an operation max=max+1 is performed in operation 611. Here, 1 is a value of the current embodiment and can be replaced by a suitable value depending on the situation of a network. Through this process, the codec transmission rate, i.e., max, is selected and/or changed.

A process of updating the time period (T) is illustrated in operations S612 through S616.

The packet loss ratio [P] is compared with a previous packet loss ratio [P−1] in operation S612. If the packet loss ratio [P] is greater than the previous packet loss ration [P−1], the packet loss interval [P] is compared with a previous packet loss interval [P−1] in operation S613. If the packet loss interval [P] is greater than the previous packet loss interval [P−1] in operation S613, the packet delay time [P] is compared with a previous packet delay time [P−1] in operation S614. If the packet delay time [P] is greater than the previous packet delay time [P−1] in operation S614, an operation T=T−1 is performed in operation S615. If [P−1] is greater in operations S612, S613, and S614, an operation T=T+1 is performed in operation S616. By performing this process, values in the previous period [P−1] are compared with the current values [P] such that the entire period T is adjusted. This adjustment of period T restricts unnecessary control functions in a situation where prediction is impossible due to the characteristic of the Internet, and when necessary, promotes the control function such that an enhanced quality can be provided. After the period adjustment process, a variable bandwidth (max) codec transmission rate is changed and data is transmitted in operation S617 and updating of variables, such as the packet delay time [P−1]=packet delay time [P], is performed in operation S618. After operation S618, if it is determined in operation S619 that the call connection is terminated or quality control is not performed, the quality control operation is finished or operation S602 is performed again.

The present invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

While the present invention has been particularly shown and described with reference to exemplary embodiments thereof, it will be understood by those of ordinary skill in the art that various changes in form and details may be made therein without departing from the spirit and scope of the present invention as defined by the following claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

According to the present invention, the transmission rate of the variable bandwidth multi-codec in a real-time Internet multimedia service is changed according to the network situation such that an optimum quality can be provided.

What is claimed is:

1. An apparatus for controlling the quality of service (QoS) of a variable bandwidth multi-codec comprising:
  a network state detection unit detecting a network state including at least one of a packet loss ratio, a packet loss interval, and a packet delay time based on a real-time transport protocol (RTP) packet transmitted to and received from a destination for which a call connection is established; and a codec control unit updating a transmission rate by comparing a detected resultant value based on the detecting network state with an already set reference value and increasing or decreasing the transmission rate, and controlling the variable bandwidth multi-codec to code data with the updated transmission rate, wherein the network state detection unit detects a network state at predetermined intervals and the predetermined intervals are adjustable via the codec control unit according to the network state such that the predetermined intervals are increased or decreased based on the result of comparing a value of a current detected network state with a value of a previously detected network state.

2. The apparatus of claim 1, wherein the network state detection unit transmits and receives data to test the network state, and the codec control unit comprises:

a prediction bandwidth determination unit determining a prediction bandwidth based on an interoperation characteristic of the network and the transmitted and received data to test the network state;

a first transmission rate update unit updating the transmission rate by decreasing the transmission rate if the determined prediction bandwidth is less than a previously updated transmission rate;

a second transmission rate update unit comparing the detected resultant value with the already set reference value and updating the transmission rate by increasing or decreasing the transmission rate; and a control unit controlling the variable bandwidth multi-codec so that coding is performed with the updated transmission rate.

3. The apparatus of claim 1, wherein the codec control unit updates the transmission rate at the predetermined intervals to control the variable bandwidth multi-codec, and the predetermined intervals are increased or decreased based on the result of comparing the value of the currently detected network state with the value of a previously detected network state.

4. The apparatus of claim 1, further comprising a codec quality measuring unit measuring the quality of voice included in a signal received from the destination, and the codec control unit increases or decreases the transmission rate based on the measured quality.

5. A method of controlling the quality of service (QoS) of a variable bandwidth multi-codec comprising:

detecting at predetermined intervals a network state including at least one of a packet loss ratio, a packet loss interval, and a packet delay time based on an real-time transport protocol (RTP) packet transmitted to and received from a destination for which a call connection is established;

adjusting the predetermined intervals by increasing or decreasing the predetermined intervals based on comparison results of a current detected value of the network state with a previously detected value of a network state; and updating a transmission rate by comparing a detected resultant value based on the detecting network state with an already set reference value and increasing or decreasing the transmission rate, and controlling the variable bandwidth multi-codec to code data with the updated transmission rate.

6. The method of claim 5, wherein the detecting of the network state comprises transmitting and receiving data to test the network state and the updating of the transmission rate and the controlling of the variable bandwidth multi-codec comprises:

determining a prediction bandwidth based on an interoperation characteristic of the network and the transmitted and received data to test the network state;

updating the transmission rate by decreasing the transmission rate if the determined prediction bandwidth is less than a previously updated transmission rate;

comparing the detected resultant value with the already set reference value and updating the transmission rate by increasing or decreasing the transmission rate; and controlling the variable bandwidth multi-codec so that coding is performed with the updated transmission rate.

7. The method of claim 5, wherein in the updating of the transmission rate and the controlling of the variable bandwidth multi-codec, the transmission rate is updated at the predetermined intervals so that the variable bandwidth multi-codec is controlled.

8. The method of claim 5, further comprising measuring the quality of voice included in a signal received from the destination, and in the updating of the transmission rate and the controlling of the variable bandwidth multi-codec, the transmission rate is increased or decreased based on the measured quality.

9. A computer readable recording medium having embodied thereon a computer program which when executed by a processor, causes the processor to perform the steps of:

detecting a network state including at least one of a packet loss ratio, a packet loss interval, and a packet delay time based on an real-time transport protocol (RTP) packet transmitted to and received from a destination for which a call connection is established;

adjusting a predetermined intervals by increasing or decreasing the predetermined intervals based on comparison results of a current detected value of the network state with a previously detected value of a network state; and updating a transmission rate by comparing a detected resultant value based on the detecting network state with an already set reference value and increasing or decreasing the transmission rate, and controlling the variable bandwidth multi-codec to code data with the updated transmission rate.

10. The computer readable recording of claim 9, wherein the computer readable recording medium is selected from the group consisting of a read-only memory (ROM), a random-access memory (RAM), a CD-ROM, a magnetic tape, a floppy disk, an optical data storage device.

* * * * *